US009083655B2

(12) United States Patent
Matthews et al.

(10) Patent No.: US 9,083,655 B2
(45) Date of Patent: Jul. 14, 2015

(54) INTERNAL CUT-THROUGH FOR DISTRIBUTED SWITCHES

(71) Applicant: Broadcom Corporation, Irvine, CA (US)

(72) Inventors: William Brad Matthews, San Jose, CA (US); Puneet Agarwal, Cupertino, CA (US); Bruce Hui Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 71 days.

(21) Appl. No.: 13/803,918

(22) Filed: Mar. 14, 2013

(65) Prior Publication Data

US 2014/0098818 A1 Apr. 10, 2014

Related U.S. Application Data

(60) Provisional application No. 61/710,222, filed on Oct. 5, 2012.

(51) Int. Cl.
*H04L 12/26* (2006.01)
*H04L 12/741* (2013.01)

(52) U.S. Cl.
CPC .................................... *H04L 45/74* (2013.01)

(58) Field of Classification Search
USPC ................. 370/351–430, 229–240
See application file for complete search history.

(56) References Cited

U.S. PATENT DOCUMENTS

| | | |
|---|---|---|
| 5,491,687 A | 2/1996 | Christensen et al. |
| 6,243,358 B1 | 6/2001 | Monin |
| 6,496,516 B1 | 12/2002 | Dabecki et al. |
| 6,661,802 B1 | 12/2003 | Homberg et al. |
| 6,795,886 B1 | 9/2004 | Nguyen |
| 7,391,787 B1 * | 6/2008 | McCrosky ................... 370/413 |
| 7,729,239 B1 | 6/2010 | Aronov et al. |
| 8,184,540 B1 | 5/2012 | Perla et al. |
| 8,767,752 B1 * | 7/2014 | Tripathi et al. ............... 370/401 |
| 2002/0118692 A1 * | 8/2002 | Oberman et al. ............. 370/419 |
| 2003/0026206 A1 | 2/2003 | Mullendore et al. |
| 2007/0180119 A1 | 8/2007 | Khivesara et al. |
| 2008/0075002 A1 | 3/2008 | Fourcand |
| 2008/0298380 A1 | 12/2008 | Rittmeyer et al. |
| 2010/0122141 A1 | 5/2010 | Arye |
| 2011/0235652 A1 | 9/2011 | Hillier, III et al. |

OTHER PUBLICATIONS

Akram Ben Ahmed et al., Efficient Look-Ahead Routing Algorithm for 3D Network-on-Chip (3D-NoC), Journal of Latex Class Files, vol. 6, No. 1, pp. 1-12, Jan. 2007.

Ling Xin et al., A Low-Latency NoC Router with Lookahead Bypass, IEEE International Symposium on Circuits and Systems, pp. 3981-3984, ISCAS 2010.

(Continued)

*Primary Examiner* — Kwang B Yao
*Assistant Examiner* — Juvena Loo
(74) *Attorney, Agent, or Firm* — Brinks Gilson & Lione

(57) ABSTRACT

Processing techniques in a network switch help reduce latency in the delivery of data packets to a recipient. The processing techniques include internal cut-through. The internal cut-through may bypass input port buffers by directly forwarding packet data that has been received to an output port. At the output port, the packet data is buffered for processing and communication out of the switch.

17 Claims, 6 Drawing Sheets

(56) References Cited

OTHER PUBLICATIONS

S. Bradner, Benchmarking Terminology for Network Interconnection Devices, RFC 1242, Harvard University, Jul. 1991, 13 pages. Downloaded from http://www.rfc-editor.org/rfc/rfc1242.txt on Oct. 18, 2012.

J. Myers, SMTP Service Extension for Authentication, RFC 2554, Netscape Communications, Mar. 1999, 12 pages. Downloaded from http://www.ietf.org/rfc/rfc2554.txt on Oct. 18, 2012.

R. Mandeville, et al., Benchmarking Methodology for LAN Switching Devices, RFC 2889, CQOS Inc. and Spirent Communications, Aug. 2000, 38 pages. Downloaded from http://www.ietf.org/rfc/rfc2889.txt on Oct. 18, 2012.

* cited by examiner

US 9,083,655 B2

INTERNAL CUT-THROUGH FOR DISTRIBUTED SWITCHES

PRIORITY CLAIM

This application claims priority to U.S. Provisional Application Ser. No. 61/710,222, filed 5 Oct. 2012, which is incorporated herein by reference in its entirety.

TECHNICAL FIELD

This disclosure relates networking. This disclosure also relates to reducing latency in communicating packets through networking devices such as switches.

BACKGROUND

High speed data networks form part of the backbone of what has become indispensable data connectivity worldwide. Within the data networks, packet switching devices direct data packets from source ports to destination ports, helping to eventually guide the data packets to their correct recipient. In virtually all instances, low latency is desirable for the delivery of the data packets to the recipient. Even when a small percentage of potential recipients are affected by latency issues, the immense number of potential recipients means that a significant number experience the latency issues. Improvements in packet switching devices and experienced latency will help improve such high speed data networks.

BRIEF DESCRIPTION OF THE DRAWINGS

The innovation may be better understood with reference to the following drawings and description. In the figures, like reference numerals designate corresponding parts throughout the different views.

FIG. 6 shows an example logic diagram for internal cut-through.

DETAILED DESCRIPTION

Figure 1:
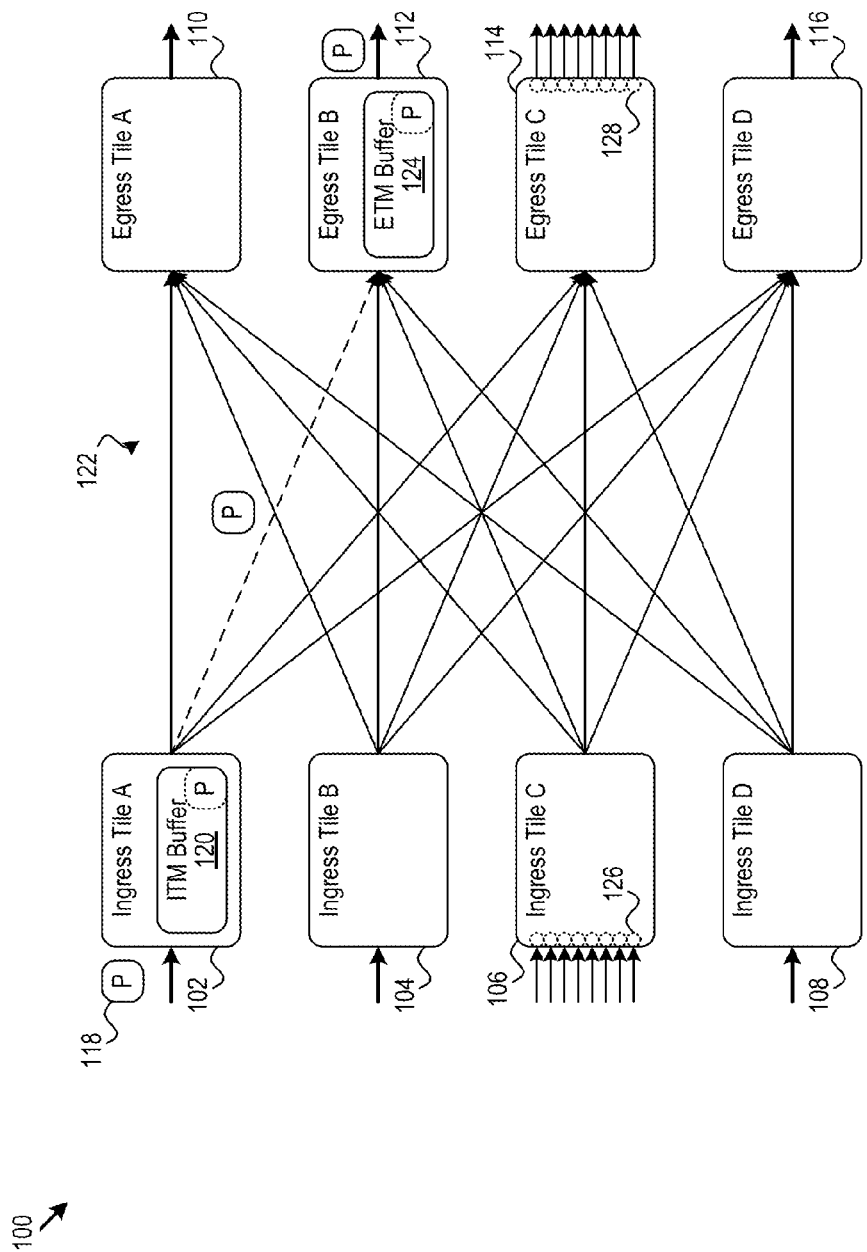
FIG. 1 shows an example of a switch architecture that switches a packet from an ingress tile to an egress tile.

FIG. 1 shows an example of a switch architecture 100 that switches packets from input ports to output ports. In the example 100, the switch architecture 100 includes several ingress tiles, e.g., the ingress tiles 102, 104, 106, and 108 and several egress tiles, e.g., the egress tiles 110, 112, 114, and 116. A switch fabric 122 connects the ingress tiles 102-108 and the egress tiles 110-116. As shown in FIG. 1, a packet 118 arrives at an input port of the ingress tile A 102 and is buffered in an ingress traffic management (ITM) buffer 120. Under control of the switch architecture 100, the packet 118 flows through the switching fabric 122 and into the egress traffic management (ETM) buffer 124 in the egress tile B 112. The egress tile B 112 sends the packet to a further destination through an output port of the egress tile B 112.

As will be explained in more detail below, the switch architecture 100 selectively performs internal cut-through of packet data. The internal cut-through helps to absorb the control loop delay in the packet traffic flow between the input ports and the output ports. Absorbing the control loop delay translates to a reduction in latency for the applications receiving the packet traffic flow.

The switch architecture 100 shown in FIG. 1 is an unfolded view. For example, each ingress tile and egress tile may be implemented as a unit (e.g., on a single die or system on a chip), as opposed to physically separate units. Each tile may handle multiple ports, any of which may be configured to be input only, output only, or bi-directional. Thus, each tile may be locally responsible for the reception, queueing, processing, and transmission of packets received and sent over the ports associated with that tile.

As an example, in FIG. 1 the ingress tile C 106 includes 8 ports, one of which is labeled port 126, and the egress tile C includes the same 8 ports, another one of which is labeled 128. Each port may provide a physical interface to other networks or devices, such as through a physical network cable (e.g., an Ethernet cable). Furthermore, each port may have its own line rate (i.e., the rate at which packets and received and sent on the physical interface). For example, the line rates may be 10 Mbps, 100 Mbps, 1 Gbps, or any other line rate. In the example of FIG. 1, assuming 1 Gbps line rate, 8 ports per tile and 4 tiles, the switch architecture would have an aggregate bandwidth of 32 Gbps. The techniques described below, however, are not limited to any particular configuration of line rate, number of ports, arrangement of ports by tiles, or number of tiles.

Figure 2:
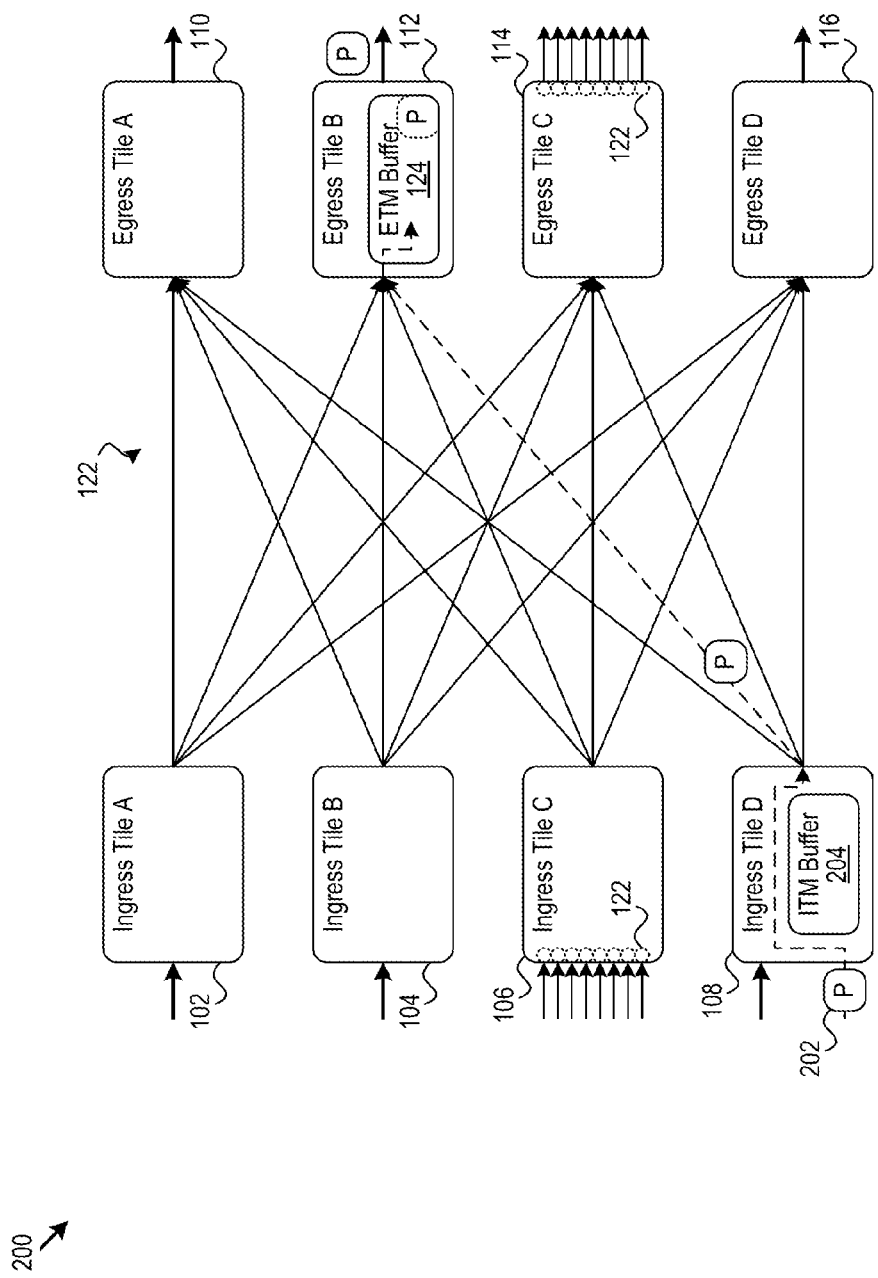
FIG. 2 shows an example of internal cut-through to bypass packet buffering at input ports.

FIG. 2 also shows an example of a switch architecture 200 that switches packets from input ports to output ports. In FIG. 2, the switch architecture 200 uses internal cut-through to forward selected packets (e.g., the packet 202) from an input port directly to an output port buffer for the correct output port. The internal cut-through may bypass the input port buffer 204, where the packet 202 would ordinarily be queued for eventual delivery to the output port. Note that in some implementations, the cut-through is internal in the sense that the input buffer (e.g., the buffer 204) is bypassed, but the output buffer (e.g., the buffer 124) is not bypassed. Internal cut-through may bypass other processing on the received packet as well, in addition to buffering at the input port.

Figure 3:
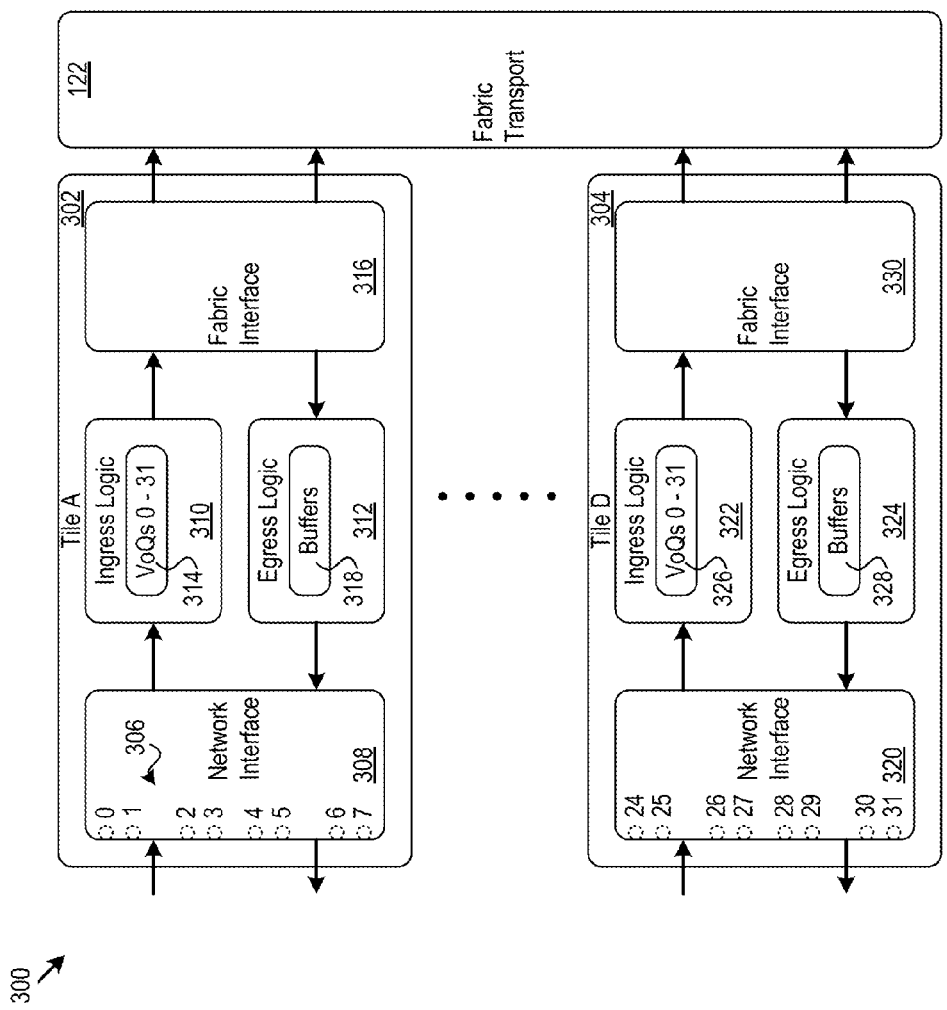
FIG. 3 is an example of a switch architecture including ingress tiles and egress tiles.

FIG. 3 shows an example switch architecture 300 in which the tiles are folded back to show that each tile may include both ingress 310 and egress logic 312. In particular, the switch architecture 300 includes one or more tiles, such as the tile 302 and the tile 304. Each tile many handle multiple (e.g., 8) individual physical ports 306. In the example in FIG. 2, tile A 302 handles ports 0 through 7 and tile D 304 handles ports 24 through 31. The ports connect to other networks or devices through the network interface 308 (e.g., a 1 Gbps Ethernet interface for each port).

The tiles include packet processing logic, which may include the ingress logic 310, the egress logic 312, and other logic. The ingress logic 310 processes incoming packets, including buffering the incoming packets by storing the packets in memory. The ingress logic 310 may define, for example, virtual output queues 314 (VoQs), by which the ingress logic 310 maintains one or more queues linking packets in memory for egress ports. The ingress logic 310 maps incoming packets from input ports to output ports, and determines the VoQ to be used for linking the incoming packet in memory. The mapping may include, as examples, analyzing addressee information in the packet headers, and performing a lookup in a mapping table that matches addressee information to output port(s).

The egress logic 312 may maintain one or more output buffers 318 for one or more of the ports in tile A 302. The egress logic 312 in any tile may monitor the output buffers for congestion. When the egress logic 312 senses congestion (e.g., when any particular output buffer for any particular port is within a threshold of reaching capacity), the egress logic may throttle back its rate of granting bandwidth credit to the ingress logic 310 in any tile for bandwidth of the congested output port. The ingress logic 310 responds by reducing the rate at which packets are sent to the egress logic 312, and therefore to the output ports associated with the congested output buffers.

Tile D 304 (and any other tile) may be implemented in the same manner as tile A 302. Thus, tile D 304 includes a network interface 320 as well as ingress logic 322 and egress logic 324. The ingress logic 322 may define and maintain VoQs 326 (e.g., one for each port in the architecture 300), while the egress logic 324 may maintain output buffers 328 (e.g., one for each output port in tile D 304). Similarly, the tile D 304 includes a fabric interface 330 for sending and receiving data on the switching fabric 122.

Figure 4:
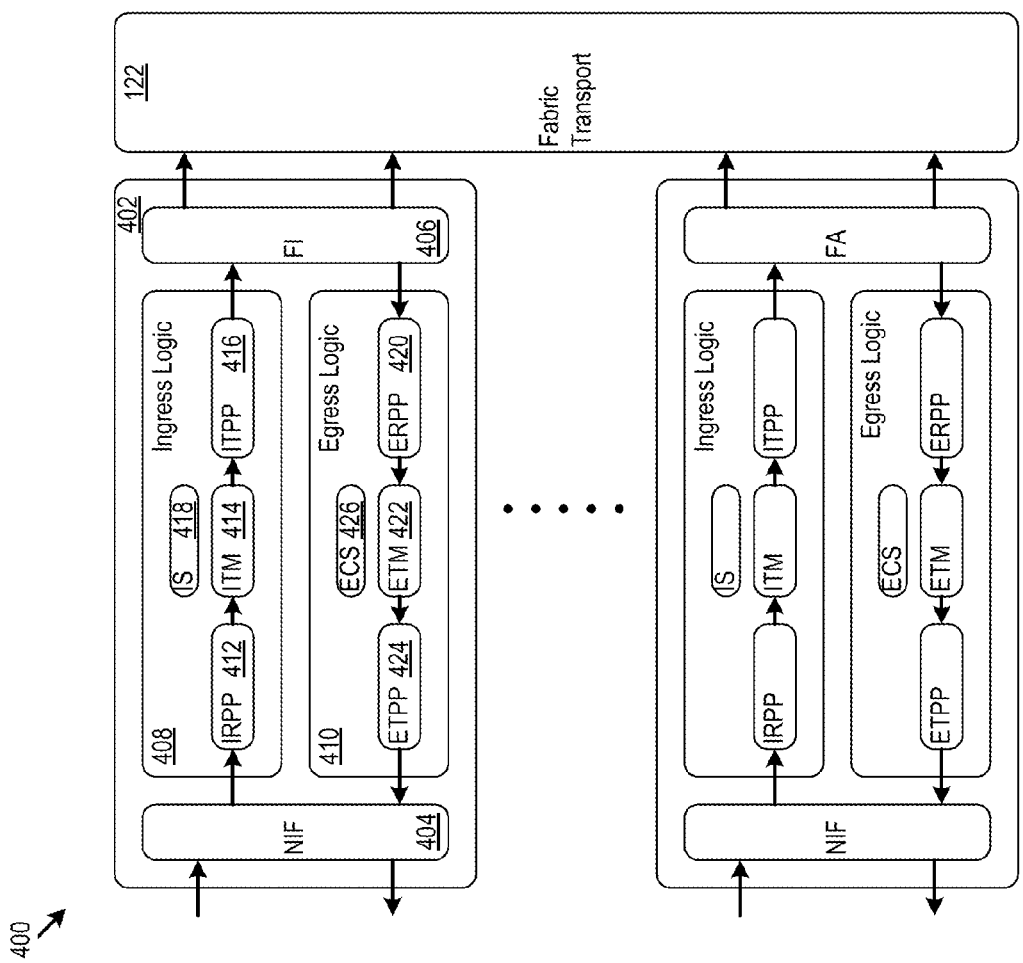
FIG. 4 is another example of a switch architecture including ingress tiles and egress tiles.

A further example of a switch architecture 400 is shown in FIG. 4. The switch architecture 400 includes tiles, such as the tile 402, connected to a switch fabric 122. Each tile includes a network interface 404, a fabric interface 406, ingress logic 408, and egress logic 410.

The ingress logic 408 receives packets arriving at the tile 402 through the network interface 404. In the ingress logic 408, the ingress receive packet processor (IRPP) 412 performs link-layer processing, tunnel termination, forwarding, filtering, and other packet processing functions on the received packets. The packets then flow to the ingress traffic manager (ITM) 414. The ITM 414 writes the packet data to a buffer, from which the ITM 414 may decide whether to accept or reject the packet. The ITM 414 associates accepted packets to a specific VoQ, e.g., for a particular output port. There may be more than one VoQ per output port, with each VoQ holding packets of any particular characteristic, such as output port, class of service (COS), priority, packet type, or other characteristic.

The ITM 414, upon linking the packet to a VoQ, generates an enqueue report. The ITM 414 may send the enqueue report to the ingress scheduler (IS) 418. The enqueue report may include the VoQ number, queue size, and other information. The ITM 414 may further determine whether a received packet should be placed on a cut-through path or on a store-and-forward path. If the receive packet should be on a cut-through path, then the ITM 414 may send the packet directly to an output port with as low latency as possible as unscheduled traffic, and without waiting for or checking for any available bandwidth credit for the output port.

For store-and-forward traffic, the ITM 414 may perform packet enqueueing functions such as storing packets in an internal packet buffer, linking packets to queues, and generating enqueue Reports. The ITM 414 may also perform packet dequeueing functions, such as retrieving packets from memory, forwarding the packets to the destination egress tiles, and issuing dequeue reports. The ITM 414 may also perform buffer management, such as admission control, maintaining queue and device statistics, triggering flow control, and other management functions.

In the egress logic 410, packets arrive via the fabric interface 406. The egress receive packet processor (ERPP) 420 may write the received packets into a buffer (e.g., a queue for an output port through which the packet will exit) in the egress traffic manager (ETM) 422. Packets are scheduled for transmission and pass through the egress transmit packet processor (ETPP) 424 and ultimately out of the output ports. The ETM 422 may perform, as examples: egress packet reassembly, through which incoming cells that arrive interleaved from multiple source tiles are reassembled according to source tile contexts that are maintained for reassembly purposes; egress multicast replication, through which the egress tile supports packet replication to physical and logical ports at the egress tile; and buffer management, through which, prior to enqueueing the packet, admission control tests are performed based on resource utilization (i.e., buffer and packet descriptors). The ETM 422 may also perform packet enqueue/dequeue, by processing enqueue requests coming from the ERPP 420 to store incoming frames into per egress port class of service (COS) queues prior to transmission (there may be any number of such COS queues, such as 2, 4, or 8) per output port.

The ETM 422 may also include an egress packet scheduler to determine packet dequeue events, resulting in packets flowing from the ETM 422 to the ETPP 424. The ETM 422 may also perform egress scheduling by arbitrating across the outgoing ports and COS queues handled by the tile, to select packets for transmission; flow control of egress credit scheduler (ECS) 426, by which, based on total egress tile, per egress port, and per egress port and queue buffer utilization, flow control is sent to the ECS 426 to adjust the rate of transmission of credit grants (e.g., by implementing an ON/OFF type of control over credit grants); flow control of tile fabric data receive, through which, based on total ETM 422 buffer utilization, link level flow control is sent to the fabric interface 406 to cease sending any traffic to the ETM 422.

The IS 418 processes the enqueue reports that it receives and updates a queue descriptor database with the new VOQ size. The queue descriptor database also maintains a credit balance and the credit request state (CRS) for the VOQ. The credit balance may represent the approximate number of bytes that a VOQ can transmit from an output port. The CRS may specify a rate at which the IS 418 should receive credit grant messages from an ECS 426. Queue status messages may be transmitted to the ECS 426 if the CRS has changed. The queue status messages may be sent by the IS 418 to any tile over the switch fabric 122.

The description of the functional elements throughout this document, their arrangement, and the processing that they carry out are examples. Many other different arrangements may be implemented. In other implementations, for example, the packet processing may be located entirely at the ingress to the device, or the ERPP 420 and ETPP 424 may be logically or physically combined. As a further example, the function of the ITM 414 and IS 418 may be combined into a central ingress traffic management function, or there may be other ingress organizations. Similarly, the egress credit scheduler may be combined with the ETM 422, depending on the implementation. As is described in detail below after some device architecture examples, regardless of the implementation, the device architecture may determine whether or not the egress is able to receive packet data via a low latency data path upon the packet arrival to the ingress. When the egress already has sufficient data to transmit, then the packet may be stored in the ITM 414 to be forwarded later in a store-and-forward approach.

In one mode of operation, the ingress logic performs internal cut-through that helps reduce or eliminate the latency associated with starting traffic flows out of any particular output port. In the internal cut-through mode, the ingress logic may bypass the VoQs (or any other packet processing at the ingress tile or input port) and directly forward packet data through the switch fabric 122 to an output buffer for an output port. Internal cut-through is in contrast to the store-and-forward mode of operation. Any of the switch architectures may transition to the store-and-forward mode after performing internal cut-through to cover the delay associated with starting a credit loop, or at any other time.

For contrast, some aspects of the store-and-forward approach are noted below, prior to discussing the internal cut-through in more detail. The store-and-forward approach is described below with reference to FIG. 3, but any switch architecture may implement such an approach. In the store-and-forward approach, the incoming packets are saved in a buffer, and the ingress logic 310 then arbitrates access to output port bandwidth for forwarding the incoming packets through the switch fabric 122, to the output port, and out of the switch. The switch fabric 122 may be a fully connected mesh transport, or other point to point interconnection, that connects each ingress tile to each egress tile. However, other topologies may also be used. The fabric interface 316 implements the input/output logic to send packets onto the switch fabric 122 to a destination and receive packets from the switch fabric 122.

In the store-and-forward approach, the ingress logic 310 may fully receive and save each incoming packet in a buffer before forwarding the received packet to its output port. For example, assume a packet has arrived on port 0, handled by the tile A 302, to depart from port 31, handled by the tile D 304. The ingress logic 310 beings to buffer the packet in a VoQ in tile A 302 for port 31. The ingress logic 310 sends a flow status message to the egress logic 324 in tile D 304 that specifies that the tile A 304 has data for the output port 31. The flow status message may act as a bandwidth credit request from the output port. The bandwidth credit is for access to the outgoing bandwidth of the output port. The egress logic 324 arbitrates among its output ports (e.g., according to a predetermined port scheduling technique) and determines whether and how much bandwidth credit to issue to the ingress logic 310 for each port, including the output port 31.

When the egress logic 324 issues bandwidth credit, the egress logic 324 sends a credit message to the ingress logic 310. The credit message specifies the bandwidth credit that the ingress logic 310 has available to send data to the output port 31 across the switch fabric 122. Once the ingress logic 310 has accumulated enough bandwidth credits to cover the amount of data in the fully enqueued packet, the ingress logic 310 sends the packet through the switch fabric 122 to the egress logic 324. The egress logic 324 may buffer or otherwise process the packet before sending the packet out of port 31.

The flow status messages and bandwidth credit messages may be communicated in-band over the switch fabric 122. Alternatively, the flow status messages and bandwidth credit messages may travel over a separate command and control bus that is physically separate from the switch fabric 122.

A tile may generate bandwidth credits at any desired rate. For example, for a tile with 4 output ports operating a line rate of 10 Gbps each, the egress logic in the tile may generate credits at a nominal rate of 40 Gbps, allocated as 10 Gbps of bandwidth credit per port. A bandwidth credit may be worth any predetermined number of bytes of bandwidth of an output port. For example, one credit may correspond to 512 bytes of bandwidth. To take an example of a packet of length of 2000 bytes, the ingress logic for the VoQ that holds the packet would accumulate at least four credits from the egress logic that handles the destination port for the packet, prior to sending the full packet to the egress logic.

There is a certain amount of overhead involved in the store-and-forward approach with the reception and forwarding process. Part of the overhead includes a control loop delay. The control loop delay is incurred, for example, when the ingress logic has zero or negative credits for the bandwidth of an output port that is the destination for a queued packet. The control loop delay may include, as example components: 1) the time for the ingress logic to generate a flow status message; 2) the time for the ingress logic to transmit the flow status message to the egress logic; 3) the time for the egress logic to receive and process the flow status message; 4) the time for the egress logic to arbitrate among its ports, determine how much bandwidth credit to give, and send a bandwidth credit message that specifies the bandwidth credit; 5) the time for the egress logic to send the bandwidth credit message to the ingress logic; and 6) the time for the ingress logic to receive and process the bandwidth credit message.

As packets arrive, the ingress logic divides the packets into cells (e.g., 128 or 256 bytes in size). Cells are written into buffers (e.g., in round robin manner across the input ports) in the ingress logic as they arrive across all the ports handled by that particular tile. Packets typically include a header and a payload. As the packet size increases, so does the time required to fully receive the packet. A 9 Kbyte packet may take as long as 5 to 10 ms to fully arrive, for example.

As noted above with regard to FIG. 2, one approach at reducing the control loop delay is internal cut-through. Any of the switch architectures described above may perform internal cut-through to bypass buffering or other processing at the input port and transfer packet data directly to an output buffer at an output port. In one implementation, the switch architectures may write enough packet data into the output buffer to absorb the time needed to start the control loop. In other words, the output port may begin sending internal cut-through packet data from its output buffer as soon as the packet data arrives in the output buffer, and while the control loop is starting up. When the control loop is established, the switch architecture may transition to the store-and-forward approach described above.

The switch architecture may determine the output port by analyzing addressee information in the packet header, to determine MAC address, IP address, or other addressee information, and analyzing mapping tables in the switch architecture that map the addressee information to an output port. When the ingress logic has determined that the data packet destination is a particular output port, the ingress logic may then determine whether the output port is eligible for internal cut-through. When the output port is eligible for internal cut-through, the ingress logic may bypass selected processing (e.g., buffering) of packet data at the input port and instead forward the packet data through the switching fabric to a buffer for the output port.

Eligibility for internal cut-through may be established in many different ways according to many different eligibility criteria. For example, one criteria is whether there is enough data already in the output buffer to continue uninterrupted communication of data out of the output port. Consider, as an example, a 10 Gbps line rate port, and a control loop delay of 10 us. The output buffer would need approximately 13.4 KB of data to absorb the control loop delay, e.g., to prevent the output port from running out of data to send, and thereby interrupting communication out of the output port, before more data arrives from the input ports. A selected threshold (e.g., 5%-20%) more than the minimum amount of data to absorb the control loop delay may be provided to the output buffer via internal cut-through. Furthermore, the data provided via internal cut-through may be one or more whole packets or only part of one or more packets. Once sufficient data has been provided to the egress to overcome any delays associated with the control loop, data from the input ports arrives on a regular basis, keeping the output buffer supplied with enough data to communicate data out of the output port without interruption.

The output port (e.g., via the egress logic) may communicate to any input port whether the output buffer has sufficient data. For example, the output port may send an eligibility status message that the ingress logic uses to set the eligibility state for the output port. As one example, the eligibility status message may convey that the output port does not have enough buffered data to absorb a control loop delay without an interruption of communication out of the output port. The interruption may be a period of time when no data is sent out of the output port because the output buffer is empty. If so, the logic may set the eligibility status to 'True' in response to the eligibility status message. On the other hand, the eligibility status message may convey that the output port has enough buffered data to absorb a control loop delay without an interruption of communication out of the output port, and if so, the logic may set the eligibility status to 'False' in response to the eligibility status message.

Another criteria is whether there is already data for the output port present in any input buffer (e.g., in any input buffer on an ingress tile) for that output port. When there is no data already in the input buffer, then the output port may be eligible for internal cut-through. Otherwise, the newly received packet data may be queued in the input buffer for the output port. One advantage of this eligibility criteria is that it helps avoid re-ordering of packet arrival at the output port. In other words, if there are already packets in the input buffer awaiting delivery to the output port, then internal cut-through may result in a subsequent packet in the sequence being delivered out of order. In some implementations, ordering concerns need not be taken into consideration when deciding eligibility, such as when the protocol to which the packets adhere is robust against out of order delivery of the packets.

Furthermore, the eligibility status information obtained from the output port may override the input buffer status. For example, if an output port runs out of data to send, or the data level in the output buffer falls below a selected threshold, the output port may indicate that it needs more data. In that event, the ingress logic may pull packet data from the input buffer and forward it immediately to the output buffer for the output port.

Figure 5:
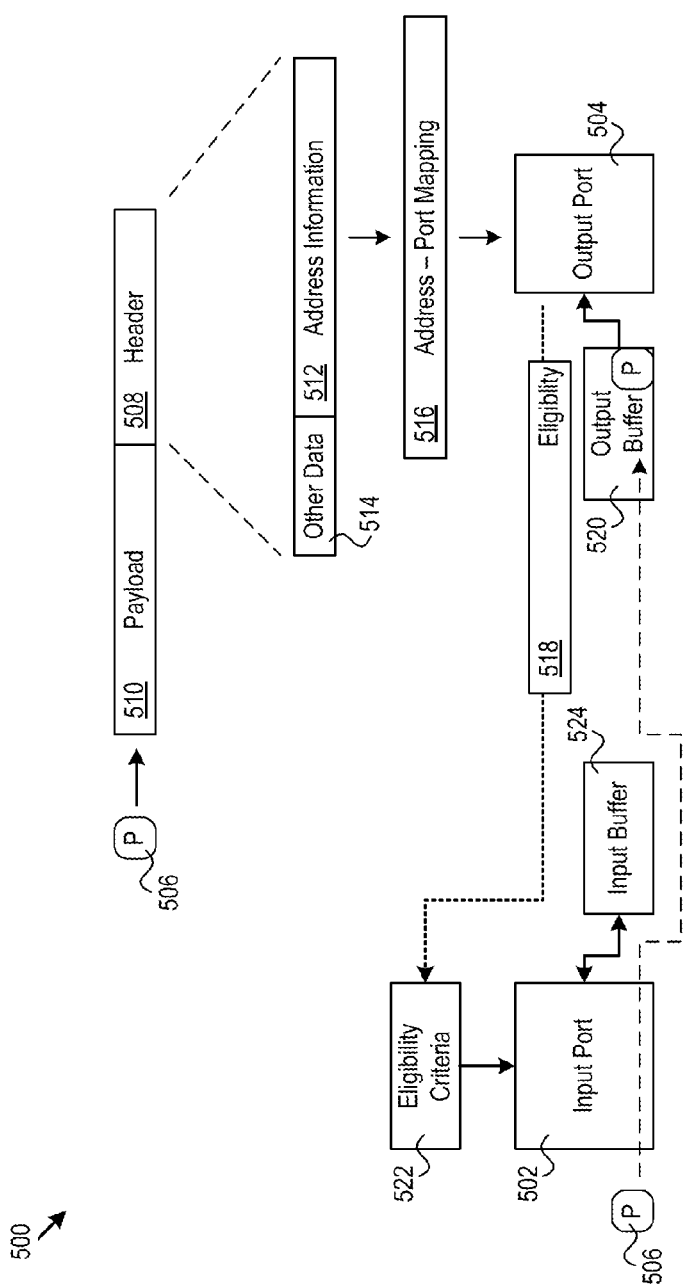
FIG. 5 is an example of internal cut-through from an input port to an output port.

FIG. 5 is an example of internal cut-through 500 from an input port 502 to an output port 504. A packet 506 begins to arrive. The packet 506 includes a header 508 (e.g., an Ethernet packet header) and a payload 510. The ingress logic analyzes the header and determines that the packet is destined for the output port 504. In particular, the header 508 includes address information 512 and other data 514. The address information 512 may include a destination address, source address, or other address information. The ingress logic may determine the destination port, e.g., the output port 504, by mapping the address information to a port number using a lookup table or other mapping 516.

At any time, the output port 504 may provide eligibility information 518 to the input port 502. As noted above, the eligibility information 518 may indicate whether the output buffer 520 has enough packet data to absorb the control loop delay. The eligibility information 518 may form part of the eligibility criteria 522 that input port considers when determining whether to perform internal cut-through of packet data from the packet 506 to the output port 504. In the example in FIG. 5, the input port 502 determines to use internal cut-through to communicate the packet data to the output port 504. As a result, the input port 502 bypasses the input buffer 524 and sends the packet data to the output port buffer 520.

Figure 6:
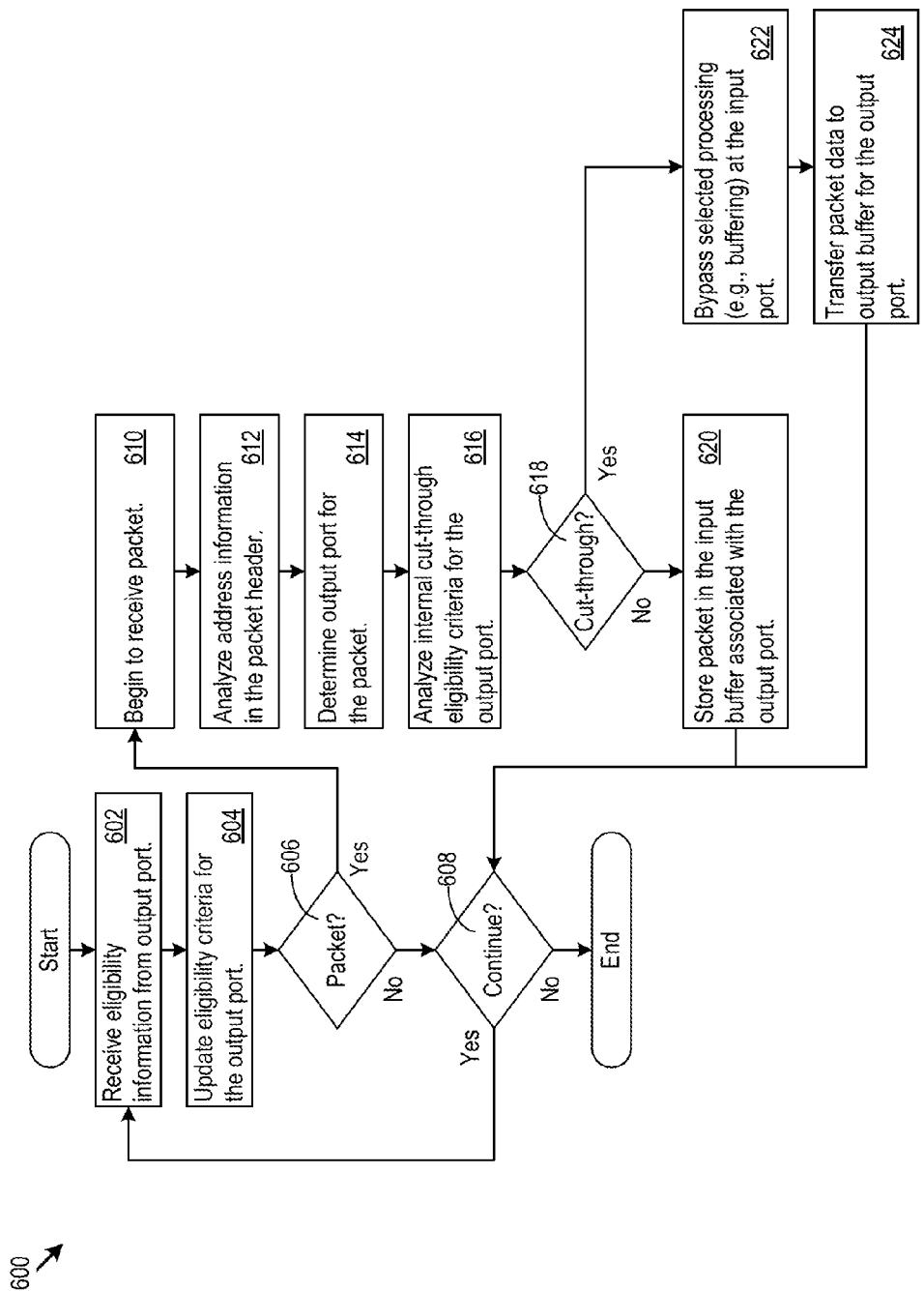

FIG. 6 shows logic 600 for internal cut-through. The logic shown in FIG. 6 may be implemented in hardware or software, such as in the ingress logic and egress logic described above. At any time, ingress tiles, ingress logic, or input ports may receive eligibility information from any egress tile, egress logic, or output port (602). The eligibility information may take the form of an eligibility message communicated from the output port to the input port. The input port updates eligibility criteria in response to receiving the eligibility information (604). The logic 600 checks for packet reception (606) and eligibility updates may continue (608) as long as desired.

When a packet arrives (606), the logic 600 begins to receive the packet (610). The logic 600 analyzes address information in the packet header (612), and determines the output port for which the packet is destined (614). Once the output port is known, the logic 600 may analyze the internal cut-through eligibility criteria for that output port (616). For example, the logic 600 may determine to use internal cut-through when the output port has indicated that it is eligible and that no packet data is already buffered at the input port (or at any input port across the whole switch architecture, in a particular ingress tile, or in some other subset of input ports) for the output port.

The logic 600 determines whether to use internal cut-through based on the eligibility criteria (618). When the logic 600 determines that it will not use internal cut-through, the logic 600 stores the newly arrived packet in the input buffer associated with the output port (620). On the other hand, when the logic 600 determines that it will use internal cut-through, the logic 600 bypasses selected processing (e.g., buffering) of the newly arrived packet at the input port (622). The logic 600 then sends packet data from the packet to the output buffer for the output port (624). The logic 600 may send the packet data in units of cells, such as 128 byte or 256 byte cells. Furthermore, the logic 600 may send all or part of the packet to the output buffer using internal cut-through. For example, the amount of data in the output buffer may increase to the amount needed to absorb the control loop delay, when only a portion of the packet is transferred into the output buffer. Accordingly, the output buffer may then signal back to the input buffer that it has enough data to absorb the control loop delay, and the signal may change the eligibility criteria for the output buffer such that the output port is no longer eligible for internal cut-through.

Described another way, the techniques described above include beginning to receive a packet at an input port, determining an output port for the packet, and determining when to perform internal cut-through of all of part of the packet. For example, the techniques may determine that the input port does not already have buffered data destined for the output port, and forward packet data from the packet to the output port without buffering the packet data at the input port. However, when the input port already has buffered data for the output port, the techniques may buffer the packet data from the packet at the input port instead of forwarding the packet data from the packet to the output port. The output port may be determined based on the header of the packet, routing tables, and other destination information.

The techniques described above may check an eligibility status for the output port before forwarding the packet data. Eligibility may be determined by receiving an eligibility status message from the output port and setting the eligibility state for the output port according to the eligibility status message. For example, the eligibility status message may convey that the output port does not have enough buffered data to absorb a control loop delay without an interruption of communication out of the output port, and if so, the logic may set the eligibility status to 'True' in response to the eligibility status message. On the other hand, the eligibility status message may convey that the output port has enough buffered data to absorb a control loop delay without an interruption of communication out of the output port, and if so, the logic may set the eligibility status to 'False' in response to the eligibility status message. The control loop delay may include sending a data credit message form the output port to the input port, sending a flow control message from the input port to the output port indicating that data is available for the output port, or other delay components including those identified above as part of the control loop.

A device such as switch or other network device may include an input port, an output port, and a switching fabric between the input port and the output port. The device also includes processing logic in communication with the input port. The packet processing logic is configured to receive a packet at the input port, the packet comprising a header, determine from the header that the packet is destined for the output port, and bypass buffering (or any other selected processing that a newly received packet would otherwise have performed) of packet data of the packet at the input port and instead forward the packet data through the switching fabric to an output buffer for the output port.

The packet processing logic may be further configured to receive an eligibility status indicator for the output port and set an eligibility status for bypass of the buffering of the packet data at the input port according to the eligibility status indicator. The eligibility status indicator may be an eligibility status message sent for the output port or may be included in such a message. The packet processing logic may be further configured to buffer the packet data at the input port instead of bypassing buffering of the packet data, when the eligibility status is 'False'; and bypass buffering at the input port when the eligibility status is 'True'. The packet data may include be an amount of data that permits the output port to send data out of the output port without an interruption. The data amount may be smaller than the packet as a whole, the entire packet, or include data from multiple packets.

As another example, the packet processing logic may receive a packet at the input port, determine that the data packet destination is the output port, and determine whether the output port is eligible for internal cut-through. When the output port is eligible for internal cut-through, the logic may bypass selected processing of packet data of the packet at the input port and instead forward the packet data through the switching fabric to a buffer for the output port.

The processing logic may be configured to determine when the output port is eligible by determining whether the output port already has enough buffered data to continue uninterrupted communication out of the output port. The eligibility test may include further criteria. For example, the logic may execute an eligibility test that includes determining whether the output port has enough buffered data to continue uninterrupted communication out of the output port, and that there is no presently buffered data for the output port at the input port. As noted above, the output port may not be eligible when buffered data at the output port is already sufficient to continue uninterrupted communication out of the output port, e.g., while a control loop executes that informs the output port of packet arrival at the input port. The uninterrupted communication may be communication at a maximum specified line rate for the output port. The selected processing may include buffering the packet data at the input port, queueing the packet at the input port for eventual delivery to the output port, processing data within the packet (e.g., error correction processing), or any other processing that the input port can apply to received packets.

The methods, devices, and logic described above may be implemented in many different ways in many different combinations of hardware, software or both hardware and software. For example, all or parts of the ingress logic and egress logic may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   beginning to receive a packet at an input port;
   determining an output port for the packet;
   determining existence of buffered data destined for the output port at an input buffer associated with the input port, the input buffer being separate from an output buffer associated with the output port:
   buffering packet data from the packet at the input buffer instead of forwarding the packet data to the output port in response to the input buffer containing buffered data destined for the output port; and
   forwarding the packet data from the packet to the output port without buffering the packet data at the input buffer in response to receiving an eligibility status message from the output port, wherein the eligibility status message conveys that the output port does not have enough buffered data to absorb a control loop delay without an interruption of communication out of the output port, and the control loop delay comprises time taken to send a data credit message from the output port to the input port.

2. The method of claim 1, wherein beginning to receive comprises:
receiving a header of the packet; and
determining the output port based on the header.

3. The method of claim 1, further comprising:
checking an eligibility status for the output port before forwarding the packet data.

4. The method of claim 3, further comprising:
setting the eligibility status for the output port according to the eligibility status message.

5. The method of claim 4, wherein:
in response to the eligibility status message, setting the eligibility status of the output port to receive the packet data from the input port without buffering.

6. The method of claim 5, wherein:
in response to the eligibility status message conveying that the output port has enough buffered data to absorb the control loop delay without the interruption of communication out of the output port, setting the eligibility status of the output port to receive the packet data via the input buffer.

7. The method of claim 1, wherein the control loop delay further comprises:
time taken to send a flow control message from the input port to the output port indicating that data is available for the output port.

8. A device comprising:
an input port;
an output port;
a switching fabric between the input port and the output port; and
packet processing logic circuitry in communication with the input port, the packet processing logic circuitry configured to:
receive a packet at the input port, the packet comprising a header;
determine from the header that the packet is destined for the output port; and
bypass buffering of packet data of the packet at the input port and instead forward the packet data through the switching fabric to an output buffer for the output port in response to the packet data comprising a data amount that the output port transmits without an interruption within a period equivalent to a time taken for the input port to request bandwidth from the output port and the output port to assign the bandwidth to the input port in response.

9. The device of claim 8, wherein the packet processing logic is further configured to:
receive an eligibility status indicator for the output port; and
initiate the bypass of the buffering of the packet data at the input port according to the eligibility status indicator.

10. The device of claim 9, wherein the eligibility status indicator comprises an eligibility status message sent for the output port.

11. The device of claim 9, wherein the packet processing logic circuitry is further configured to:
buffer the packet data at the input port instead of bypassing buffering of the packet data, when the eligibility status is 'False'; and
bypass buffering at the input port when the eligibility status is 'True'.

12. The device of claim 8, wherein the packet processing logic circuitry is further configured to determine if an input buffer already contains packet data destined for the output port and bypass the buffering of packet data of the packet at the input port in response to an absence of packet data destined for the output port already being contained in the input buffer.

13. The device of claim 8, wherein the data amount is smaller than a size of the received packet.

14. A device comprising:
an input port;
an output port;
a switching fabric between the input port and the output port; and
packet processing logic circuitry in communication with the input port, the packet processing logic circuitry configured to:
receive a packet at the input port;
determine that a data packet destination is the output port;
determine eligibility of the output port for internal cut-through by examination of packet data presently buffered at an input buffer, wherein the output port is determined as eligible for internal cut-through in response to the input buffer not containing packet data buffered for the output port and based on a comparison of an amount of buffered data in the input buffer and a calculated amount of data required for an uninterrupted communication out of the output port for a period of time, wherein the period of time represents a time to setup a store and forward data transfer from the input port to the output port; and
when the output port is eligible for internal cut-through, bypass selected processing of packet data of the packet at the input port and instead forward the packet data through the switching fabric to a buffer for the output port.

15. The device of claim 14, wherein the time to setup store and forward data transfer from the input port to the output port comprises time taken to send a message from the input port to the output port that informs the output port of packet arrival at the input port.

16. The device of claim 14, wherein the uninterrupted communication comprises uninterrupted communication at a maximum specified line rate for the output port.

17. The device of claim 14, wherein the selected processing that is performed based on the eligibility of the output port comprises buffering the packet data at the input port and maintaining a queue of the packet data.

* * * * *